United States Patent [19]

Yonemitsu et al.

[11] 3,989,671

[45] Nov. 2, 1976

[54] PROCESS FOR PRODUCING POLYPHENYLENE OXIDES

[75] Inventors: Eiichi Yonemitsu, Kashiwa; Akitoshi Sugio, Tokyo; Tetsuo Tomita, Tokyo; Tadashi Yoshii, Tokyo; Akira Ito, Tokyo, all of Japan

[73] Assignee: Mitsubishi Gas Chemical Company, Inc., Tokyo, Japan

[22] Filed: Feb. 22, 1974

[21] Appl. No.: 445,042

Related U.S. Application Data

[63] Continuation-in-part of Ser. No. 244,247, April 14, 1972, abandoned.

[30] Foreign Application Priority Data

Apr. 14, 1971 Japan.............................. 46-23034
Apr. 14, 1971 Japan.............................. 46-23035

[52] U.S. Cl. .......................................... 260/47 ET
[51] Int. Cl.² .................................... C08G 65/44
[58] Field of Search ............................... 260/47 ET

[56] References Cited

UNITED STATES PATENTS

| | | |
|---|---|---|
| 3,306,874 | 2/1967 | Hay...................................... 260/47 |
| 3,306,875 | 2/1967 | Hay...................................... 260/47 |
| 3,365,422 | 1/1968 | Van Dort............................. 260/47 |
| 3,787,358 | 1/1974 | Nishioka et al................. 260/47 ET |

FOREIGN PATENTS OR APPLICATIONS 2,217,161  11/1972  Germany

OTHER PUBLICATIONS

Yudkin et al., Plast. Massy 1968(8), 26–27.

*Primary Examiner*—Lester L. Lee
*Attorney, Agent, or Firm*—Sughrue, Rothwell, Mion, Zinn and Macpeak

[57] ABSTRACT

Polyphenylene oxides, self-condensation products of phenols, are produced through oxidative coupling by employing a novel catalyst system which comprises a copper compound, an iodine compound and tertiary diamine which is capable of forming a stable chelate ring with the copper compound.

According to this invention, copper compounds, which hitherto have been considered to be unsuitable for using with tertiary amines, act with excellent performance as a component of the catalyst.

32 Claims, No Drawings

PROCESS FOR PRODUCING POLYPHENYLENE OXIDES

CROSS REFERENCE TO RELATED APPLICATIONS

The present application is a Continuation-in-part of U.S. application Ser. No. 244,247 Yonemitsu et al, filed Apr. 14, 1972, and now abandoned entitled "A Process for Producing Polyphenylene Oxides".

DETAILED DESCRIPTION OF THE INVENTION:

This invention relates to a process for condensing phenols to produce polyphenylene oxides useful as thermoplastics. More particularly, this invention relates to the production of polyphenylene oxides by reacting substituted phenols with oxygen employing a novel catalyst system in the process using a copper compound and a tertiary amine as the catalyst.

Heretofore, a combination of a tertiary amine with a cupric salt has generally been considered to be unsuitable for the production of polyphenylene oxides, unless some special treatment is applied to the cupric salt. It has also been considered to be unsuitable to use a tertiary amine in the combination of cuprous cyanide, cuprous thiocyanate, cuprous iodide or cuprous sulfide as a catalyst.

The object of this invention is to provide a novel catalyst system very effective for producing polyphenylene oxides.

A further object of this invention is to provide a process for remarkably increasing the polymerization velocity, as well as obtaining colorless products having a high polymerization degree.

Another object of this invention is to provide a process for turning a catalyst system, which hitherto has been considered to be unsuitable, into a suitable system.

It has now been discovered that especially advantageous results are obtained when an iodine compound is present in a catalyst system comprising a copper compound and a tertiary diamine which is capable of forming a stable chelate ring with said copper compound.

According to this invention, various cupric salts and cuprous salts such as cupric chloride, cupric bromide, cupric fluoride, cuprous sulphate, cupric sulphate, cuprous sulfide, cupric sulfide, cuprous oxide, cupric oxide, cuprous acetate, cupric acetate, cupric propionate, cupric butyrate, cupric benzoate, basic cupric carbonate, basic cupric acetate, cupric hydroxide, cupric nitrate, cuprous iodide, cuprous cyanide, cuprous thiocyanate, cupric thiocyanate, di-μ-methoxo-bis(acylketonate)di-copper(II), etc. Cuprous chloride and cuprous bromide are not necessary for use in the present invention, though they can be used.

Preferred cupric materials include cupric: sulfide, sulphate, nitrate, chloride, basic carbonate, hydroxide, acetate, bromide or fluoride.

Cupric phosphate, cupric oxalate, cupric pyrophosphate may be considered to be a stable complex by themselves, and they are not further capable of forming a complex with the amine, which is required of copper compounds used in the present invention. Accordingly, they are not suitable for our process.

Cuprous cyanide, cuprous thiocyanate, cuprous iodide and cuprous sulfide are preferred as cuprous materials which serve as an excellent component of the polymerization catalyst, as are cupric oxide or cuprous oxide.

Through the process of this invention, there can easily be produced polyphenylene oxides having an intrinsic viscosity of more than 1.3 dl/gr measured in chloroform at 25° C, which has hardly been attained through hitherto known processes.

Copper compounds in our invention may be used by themselves or as a mixture thereof. The amount to be employed may widely vary, and 0.1 – 100% by weight based on the amount of phenols used is preferable.

As amines used in this invention, there may be mentioned tertiary diamines represented by the following formulas:

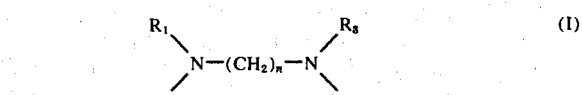

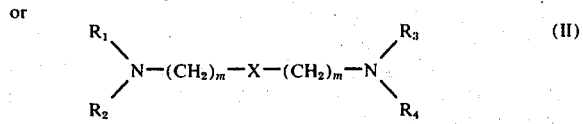

where $R_1$, $R_2$, $R_3$ and $R_4$ are an alkyl radical having a carbon number of 1–3; $n$ is an integer of 1–6 and m 1 or 2; and X is oxygen or sulphur.

A complex having a chelate ring formed may be designated by the following formula:

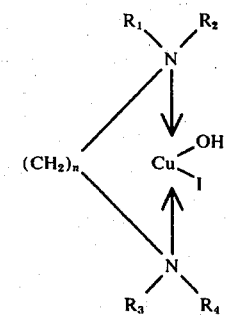

when a formula (I) compound is employed as the tertiary diamine and cuprous iodide as the copper compound. When $n$ is 2 or 4, the chelate ring formed is most stable.

Typical examples of such diamines are N,N,N',N'-tetramethylethylenediamine, N,N,N',N'-tetramethyl-1,3-propanediamine, N,N,N',N'-tetramethyltetramethylenediamine, bis-(N,N-diethylaminoethyl)-ether, bisdimethylaminomethyl)-sulfide, etc.

As the iodine compound, substances which are capable of liberating iodine anion or a simple substance of iodine in the reaction solution can be used. Examples of the compound are iodine itself, hydrogen iodide, an inorganic iodide, e.g., an alkali metal iodide such as potassium iodide, and an alkyl iodide, e.g., a lower alkyl iodide such as ethyl iodide, etc. Preferred lower alkyl iodides are the $C_1 - C_4$ alkyl iodides.

The amount of iodine compound may also be varied widely, and it is preferably employed in an amount of 10 – 100 mole %, based on the copper compound.

Cuprous iodide, which contains an iodine atom in the molecule, acts by itself with excellent performance even in the absence of other iodine compound.

The phenols which can be condensed by our process may be represented by the following formula:

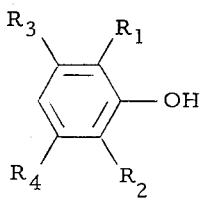

wherein $R_1$ is a substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, $R_2$, $R_3$ and $R_4$ are the same as $R_1$ and in addition, hydrogen and chlorine, provided that $R_1$, $R_2$, $R_3$ and $R_4$ are each free of a tertiary $\alpha$-carbon atom.

Phenols with a substituent having less than 6 carbon atoms are most preferred for use in the process of the present invention.

Typical examples of the phenols are the 2,6-di lower alkyl phenols such as 2,6-dimethylphenol, 2-methyl-6-ethylphenol and 2,6-diethylphenol, and other phenols such as 2,6-dimethoxyphenol, 2-methoxy-6-methyl phenol, 2-methyl-6-phenylphenol, 2,6-diphenylphenol, 2,6-dimethyl-3-chlorophenol, etc.

In general, phenols as are disclosed in U.S. Pat. No. 3,306,875 Hay can be condensed via the process of the present invention. However, the present invention is of wider application in the condensation of phenols outside the methods disclosed in the above patent.

Solvents to dissolve the condensation products are generally used, which include benzene, toluene, xylene, ethylbenzene, dichloroethane, tetrachloroethane, chloroform, etc. They are used by themselves or as a mixture of them with other solvents.

It may be possible to use alcohols, which do not practically dissolve the condensation products, with the above-mentioned solvents for the products in a proper amount.

Oxidizing agents in this invention may be oxygen gas or an oxygencontaining gas which is a mixture of oxygen gas and an inert gas. Air is the most familiar oxygen-containing gas. However, the inert gas is not limited to nitrogen.

The reaction temperature in this invention may widely vary and usually room temperature can be applied satisfactorily. The reaction time may vary depending upon the conditions adopted in each case, and the reaction may be either stopped at the point where the theoretically required amount of oxygen has been absorbed or continued for a certain time after that point has been reached in order to obtain highly condensed products.

Example 1

In a reaction vessel were charged 0.24 gr. (1m. mol.) of basic cupric carbonate ($CuCO_3 \cdot Cu(OH)_2$), 0.13 gr. of iodine and 6 ml. of isopropylalcohol, and there was added a solution of 0.52 gr. of N,N,N',N'-tetramethyl1,3-propanediamine and 10 ml. of toluene. The atmosphere within the vessel was replaced with oxygen and the mixture was stirred for 15 minutes.

Then, 2.44 gr. (20m. mol.) of 2,6-dimethylphenol dissolved in 45 ml. of toluene was added thereto and the mixture was stirred. Oxygen gas was fed under atmospheric pressure by means of a gas burette as the oxidation proceeded. After stirring for 160 minutes keeping the reaction temperature at 30° C, 241 ml. of oxygen was absorbed and green precipitation was seen to partly form. After an additional 30 minutes stirring under the oxygen atmosphere, the reaction mixture was poured into 400 ml. of methanol containing a small amount of hydrochloric acid, whereby the polymer was precipitated.

The precipitated polymer was filtered, washed with methanol containing a small amount of hydrochloric acid, and dissolved again in benzene. Then the polymer was reprecipitated by the addition of methanol, filtered again and washed with methanol. After drying at 60° C under reduced pressure, there was obtained 2.37 gr. of poly-(2,6-dimethyl-1,4-phenylene)ether.

The product was quite colorless and its intrinsic viscosity measured in chloroform at 25° was 1.5 dl./gr.

Examples 2–10

The following Table 1 shows the results of experiments on the oxidative coupling of 2,6-dimethylphenol employing diamines, iodine compounds and various kinds of cupric salts.

Amine A in the table means N,N,N',N'-tetramethylethylenediamine and amine B means N,N,N',N'-tetramethyl-1,3-propanediamine. The amounts of 2,6-dimethylphenol, the diamines and cupric salts are 20 m. mol, 4 m. mol. and 2 m. mol., respectively.

In all cases 6 ml. of isopropyl alcohol and 55 ml. (in total) of toluene were employed. Addition of the materials was carried out according to Example 1. The reaction temperature was kept at 30° C. After having absorbed the theoretical amount of oxygen, the reaction was continued for another 30 minutes. Further treatment was carried out similar to Example 1.

Table 1

| Ex. No. | Amine | Cupric compd. kind | amt. (gr.) | I compd. kind | amt. | Time for absorption of theo. $O_2$ (min.) | Yield (gr.) | Intrinsic viscosity (dl/gr) |
|---|---|---|---|---|---|---|---|---|
| 2 | A | $CuCl_2$ | 0.27 | $I_2$ | 0.13 gr. | 85 | 2.35 | 0.96 |
|   |   |   |   | KI | 0.34 gr. | 90 | 2.40 | 1.10 |
|   |   |   |   | $C_2H_5I$ | 5 ml. | 85 | 2.36 | 1.25 |
| 3 | A | $CuBr_2$ | 0.45 | $I_2$ | 0.13 gr. | 300 | 2.37 | 1.21 |
|   | A | $Cu(NO_3)_2 \cdot 3H_2O$ | 0.48 | $I_2$ | 0.13 gr. | 255 | 2.32 | 0.57 |
| 5 | B | $CuCl_2$ | 0.27 | $I_2$ | 0.13 gr. | 27 | 2.35 | 1.53 |
|   |   |   |   | KI | 0.34 gr. | 30 | 2.40 | 1.69 |
| 6 | B | $CuBr_2$ | 0.45 | $I_2$ | 0.13 gr. | 80 | 2.40 | 1.89 |
| 7 | B | $Cu(CH_3COO)_2 \cdot H_2O$ | 0.40 | $I_2$ | 0.13 gr. | 140 | 2.40 | 1.76 |
| 8 | B | $Cu(OH)_2$ | 0.20 | KI | 0.34 gr. | 120 | 2.40 | 2.10 |
| 9 | B | CuS | 0.19 | $I_2$ | 0.13 gr. | 290 | 2.38 | 0.62 |
| 10 | B | $CuCO_3 \cdot Cu(OH)_2$ | 0.24 | KI | 0.34 gr. | 150 | 2.36 | 1.38 |

Table 1-continued

| Ex. No. | Amine | Cupric compd. kind | amt. (gr.) | I compd. kind | amt. | Time for absorption of theo. $O_2$ (min.) | Yield (gr.) | Intrinsic viscosity (dl/gr) |
|---|---|---|---|---|---|---|---|---|
| | | | | $C_2H_5I$ | 5 ml. | 155 | 2.33 | 1.40 |

Example 11

A solution of 2.68 gr. (20 m. mol.) of 2-methyl-6-ethylphenol, 0.52 gr. (4 m. mol.) of N,N,N',N'-tetramethyl-1,3-propanediamine, and 20 ml. of n-propyl alcohol dissolved in 40 ml. of toluene was charged in a reaction vessel together with 0.13 gr. of iodine. By stirring the mixture, a lightyellow homogeneous solution was obtained. To the solution was added 0.18 gr. (2m. mol.) of cuprous cyanide in powder form. The atmosphere within the vessel was replaced with oxygen. After stirring for 240 minutes keeping the reaction temperature at 35° C while passing oxygen gas therethrough, 246 ml. of oxygen was absorbed. The reaction was continued for another 30 minutes. Further treatment was carried out according to Example 1. There was obtained 2.56 gr. of poly-(2-methyl-6-ethyl-1,4-phenylene)-ether having an intrinsic viscosity of 0.85 dl./gr.

Examples 12–14

The following Table 2 shows the results of experiments on the oxidative coupling of 2,6-dimethylphenol employing N,N,N',N'-tetramethyl1,3-propanediamine, iodine compounds and cuprous salts.

The amounts of 2,6-dimethylphenol, the diamine and cuprous salt are 20 m. mol., 4 m. mol. and 2 m. mol., respectively.

In all cases 6 ml. of isopropyl alcohol and 55 ml. of toluene were employed.

The treatments were carried out similar to Example 11.

In Example 14, 2 m. mol. of cuprous iodide was employed without using any other iodine compound.

Table 2

| Ex. No. | Cuprous compd. | I compd. kind | amt. | Yield (gr.) | Intrinsic viscosity (dl/gr) |
|---|---|---|---|---|---|
| 12 | CuSCN | $I_2$ | 0.13 gr. | 2.40 | 1.57 |
| | | HI (52% aq.) | 1 ml. | 2.39 | 1.37 |
| | | KI | 0.34 gr. | 2.40 | 1.60 |
| | | $C_2H_5I$ | 5 ml. | 2.30 | 1.40 |
| 13 | Cu S ½ | $I_2$ | 0.13 gr. | 2.40 | 0.68 |
| 14 | CuI | — | none | 2.36 | 1.85 |

Example 15

The results of employing ammonium iodide as compared to ammonium chloride in the presence of a tertiary diamine were compared in this Example.

Following the basic procedure of Example 1, the following reaction conditions were observed.

| | |
|---|---|
| Phenol: | 2,6-dimethylphenol, 2.44 gr.(20 m. mol) |
| Copper Compd.: | $CuCl_2.2H_2O$, 0.34 gr. (2 m. mol) |
| Tertiary Diamine: | N,N,N',N'-tetramethylethylenediamine, 0.46 gr. (4 m. mol) |
| Solvent: | 55 gr. of toluene and 6 gr. of isopropyl alcohol |
| Oxidizing Agent: | oxygen gas |
| Reaction: | at 30 – 35° C. for 180 min. |

The results with the use of $NH_4I$ and $NH_4Cl$ are set out below.

| | $NH_4I$ 0.290 gr. (2 m. mol.) | $NH_4Cl$ 0.107 gr. (2 m. mol.) |
|---|---|---|
| Yield (%) | 99.5 | 92 |
| Intrinsic Viscosity $[\eta]$dl./gr. | 0.8 | 0.3 |

As is easily seen from the above table, the intrinsic viscosity of the product using ammonium chloride is very small, whereas the product in the iodide process has an intrinsic viscosity about 3 times as large as that in the process using ammonium chloride and has better yield.

Example 16

Following the basic procedures of the earlier Examples except for using N,N,N',N'-tetramethylethylene diamine, the following results were obtained:

| Cupric kind | compd. amount (gr.) | I compd. kind | Amount (ml) | Time (min.) | Yield (%) | $[\eta]$ (dl./gr.) |
|---|---|---|---|---|---|---|
| $CuCl_2$ | 0.27 | $C_2H_5I$ | 5 | 62 | 98.3 | 0.70 |
| $CuCl_2$ | 0.27 | $C_3H_7I$ | 5 | 75 | 98.0 | 0.66 |

While the invention has been particularly shown and described with reference to preferred embodiments thereof, it will be understood by those skilled in the art that various changes in form and details may be made therein without departing from the spirit and scope of the invention.

What is claimed is:

1. A process for preparing polyphenylene oxides which comprises forming self-condensation products by oxidizing substituted phenols with oxygen or an oxygen containing gas in the presence of a tertiary diamine, the improvement which comprises using a catalytically effective amount of a catalyst which is a combination of a copper compound, capable of forming a chelate ring with said tertiary diamine, with a material which yields iodine or iodine anions in the reaction system.

2. The process of claim 1 in which the tertiary diamine is represented by the following formulas:

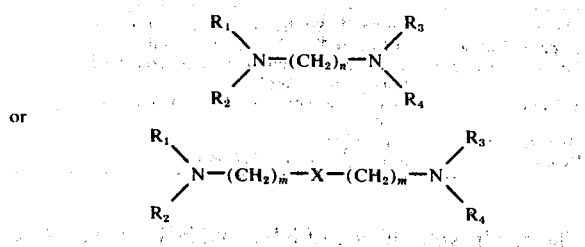

or where $R_1$, $R_2$, $R_3$ and $R_4$ are an alkyl radical having a carbon number of 1-3; n is an integer of 1-6 and m 1 or 2; and X is oxygen or sulphur.

3. The process of claim 2 in which the tertiary diamine is N,N,N',N'-tetramethylethylenediamine, N,N,N',N'-tetramethyl-1,3-propanediamine or N,N,N',N'-tetramethyltetramethylene diamine.

4. The process of claim 2 in which the tertiary diamine is bis(N,N-diethylaminoethyl)-ether or bis-(dimethylaminomethyl)-sulfide.

5. The process of claim 1 wherein said copper compound is a cupric salt.

6. The process of claim 5 wherein said cupric salt is selected from the group consisting of cupric sulfide, cupric sulfate, cupric nitrate, cupric chloride, basic cupric carbonate, cupric hydroxide, cupric acetate, cupric bromide or cupric fluoride.

7. The process of claim 1 in which the substituted phenols are 2,6-di-lower alkyl substituted phenols.

8. The process of claim 1 wherein the inorganic iodide is an alkali metal iodide.

9. The process of claim 1 wherein said copper compound is a cuprous salt.

10. The process of claim 1 wherein said material which yields iodine or iodine anions in the reaction system yields iodine.

11. The process of claim 1 where the polyphenylene oxide has an intrinsic viscosity of more than 1.3 dl./gr., measured in chloroform at 25° C.

12. The process of claim 1 wherein said material which yields iodine or iodine anions in the reaction system yields iodine anions.

13. The process of claim 1 where the oxidation is in a solvent which dissolves the polyphenylene oxide.

14. The process of claim 13 where the solvent is benzene, toluene, xylene, ethylbenzene, dichloroethane, tetrachloroethane, chloroform or a mixture thereof.

15. The process of claim 1 where the substituted phenol is 2,6-dimethylphenol, 2-methyl-6-ethylphenol, 2,6-diethylphenol, 2,6-di-methoxyphenol, 2-methoxy-6-methylphenol, 2-methyl-6-phenylphenol, 2,6-diphenylphenol or 2,6-dimethyl-3-chlorophenol.

16. The process of claim 10 wherein said material is iodine.

17. The process of claim 12 wherein said material is hydrogen iodide.

18. The process of claim 12 wherein said material is an alkali metal iodide.

19. The process of claim 12 wherein said material is ethyl iodide.

20. In a process for producing polyphenylene oxides which comprises forming self-condensation products by oxidizing substituted phenols with oxygen or oxygen-containing gas, the improvement which comprises employing a catalytically effective amount of a catalyst system comprising cuprous iodide, which yields iodide anions in the reaction system, and a tertiary diamine, wherein said tertiary diamine is capable of forming a stable chelate ring with said copper compound.

21. The process of claim 20 in which the tertiary diamine is represented by the following formulas:

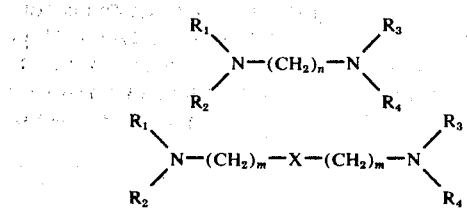

where $R_1$, $R_2$, $R_3$ and $R_4$ are an alkyl radical having 1–3 carbon atoms, n is an integer of 1–6, m is 1 or 2, and X is oxygen or sulphur.

22. The process of claim 21 in which the tertiary diamine is N,N,N',N'-tetramethylethylenediamine, N,N,N',N'-tetramethyl-1,3-propanediamine or N,N,N',N'-tetramethyltetramethylene diamine.

23. The process of claim 21 in which the tertiary diamine is bis-(N,N-diethylaminoethyl)-ether or bis-(dimethylaminoethyl)-sulfide.

24. The process of claim 20 in which the substituted phenols are 2,6-di-lower alkyl substituted phenols.

25. The process of claim 20 where the polyphenylene oxide has an intrinsic viscosity of more than 1.3 dl./gr., measured in chloroform at 25° C.

26. The process of claim 20 where the oxidation is carried out in a solvent which dissolves the polyphenylene oxide.

27. The process of claim 26 where the solvent is benzene, toluene, xylene, ethylbenzene, dichloroethane, tetrachloroethane, chloroform or a mixture thereof.

28. The process of claim 20 where the substituted phenol is 2,6-dimethylphenol, 2-methyl-6-ethylphenol, 2,6-dimethylphenol, 2,6-dimethoxyphenol, 2-methoxy-6-methylphenol, 2-methyl-6-phenylphenol, 2,6-diphenylphenol or 2,6-dimethyl-3-chlorophenol.

29. The process of claim 9 wherein said cuprous salt is selected from the group consisting of cuprous cyanide, cuprous thiocyanate, cuprous iodide and cuprous sulfide.

30. The process of claim 1, wherein a material which yields iodine or iodide anions in the reaction system is iodine, hydrogen iodide, and alkali metal iodide or ethyl iodide.

31. The process of claim 6, wherein a material which yields iodine or iodide anions in the reaction system is iodine, hydrogen iodide, an alkali metal iodide or ethyl iodide.

32. The process of claim 29, wherein a material which yields iodine or iodide anions in the reaction system is iodine, hydrogen iodide, an alkali metal iodide or ethyl iodide.

* * * * *